Figure 1:
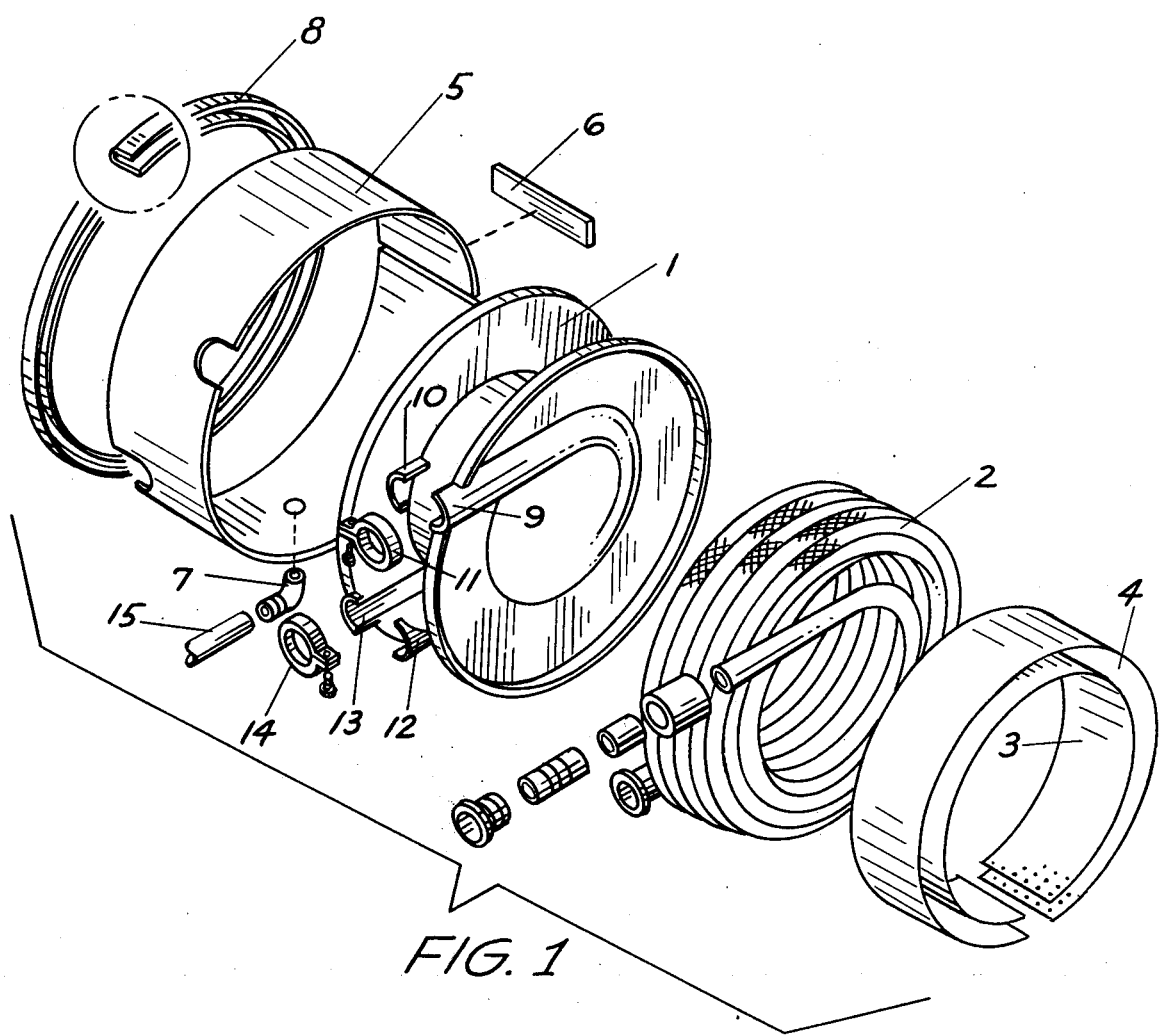

United States Patent [19]
Richardson et al.

[11] 3,983,194
[45] Sept. 28, 1976

[54] PROCESS FOR MANUFACTURING A HELICAL REVERSE OSMOSIS SEGMENT

[75] Inventors: John L. Richardson, Birmingham, Mich.; Gilbert Segovia, Santa Ana; Clarke H. Lewis, Fountain Valley, both of Calif.

[73] Assignee: Oxy Metal Industries Corporation, Warren, Mich.

[22] Filed: July 13, 1971

[21] Appl. No.: 162,247

[52] U.S. Cl. .............................. 264/41; 210/321 R; 210/497.1; 264/321; 264/339
[51] Int. Cl.² ................... B01D 31/00; B01D 13/00
[58] Field of Search ................. 210/321, 23, 497.1; 264/269, 314, 311, 321, 339, 41; 29/163.5 F; 156/294

[56] References Cited
UNITED STATES PATENTS

| | | | |
|---|---|---|---|
| 2,864,506 | 12/1958 | Hiskey | 210/23 X |
| 3,547,272 | 12/1970 | Shaines | 210/321 |
| 3,579,400 | 5/1971 | Kahyok et al. | 210/321 X |

FOREIGN PATENTS OR APPLICATIONS

| | | | |
|---|---|---|---|
| 860,105 | 1/1971 | Canada | 210/321 |

*Primary Examiner*—Frank A. Spear, Jr.
*Attorney, Agent, or Firm*—Arthur E. Kluegel; Richard P. Mueller; Bertram F. Claeboe

[57] ABSTRACT

This invention relates to a filtration unit for use in reverse osmosis purification, separation, or concentration plants or systems, and in particular to a unique method of winding a length of reinforced cast membrane tubing into a helical form while subjected to high pressure and elevated temperature.

4 Claims, 3 Drawing Figures

PROCESS FOR MANUFACTURING A HELICAL REVERSE OSMOSIS SEGMENT

THE INVENTION

Tubular reverse osmosis membranes are used, for example, in reverse osmosis purification plants, are normally made in straight lengths, sometimes 20 feet long or more, and, accordingly, some difficulty is presented in handling, both in the initial assembly stage and in their subsequent replacement. Additionally, because a pressure support backing is required for the membrane, and because such lengths are easily damaged by mishandling and in transportation, quite rigid supporting structures are necessary during shipment and after installation into a module, a module being an assembly of a number of such membranes. Moreover, because the output of the "product fluid", which is the fluid subjected to the reverse osmosis treatment, is a function of the total area of the membrane, it is usual to employ a large number of such tubular membranes either in series, parallel, or both, which in turn necessitates an operating support structure of considerable size. A reduction in the length and an increase in the number of straight tubular membranes is undesirable for the reason that more end fittings are required with the attendant extra cost and possibility of leakage or other failure. It has been recognized therefore, by those familiar with the art that for a given product water output fewer and longer tubular membranes are desirable.

The difficulty experienced in installing and replacing long straight membranes has frequently necessitated that two or more men were required to perform the task with the ever-present risk that inadvertently the membrane would be flexed beyond its designed limit and would be weakened or permanently damaged thereby. Accordingly, the fundamental feature of this invention is to employ a specially prepared tubular membrane of considerable length; for example, 50 feet or more, that can be formed into a coiled or helical configuration constituting a segment which can be interconnected with other such segments in series or parallel to form a fluid purification system of any desired output capacity. As will be more fully explained below, the tubular membrane is wound onto a spool with the end fittings terminating in and being supported by the flange or flanges of the spool or supported in any other convenient manner. The flanges of the spool are greater in diameter than the coiled membrane; therefore, the membrane is protected from damage when, for instance, it is placed upon the floor. Additionally, such a membrane in coiled form can easily be handled by one man without risk of damage. It has been discovered that by employing certain techniques both before, during and after the coiling of a membrane into a helical form a number of advantages result, as will be more fully explained below.

It is an object of the present invention, therefore, to provide a compact and efficient fluid purification concentration which can be used singly or in plurality.

It is a further object of this invention to provide a segment which can contain a predetermined length of tubular membrane in such a way that tubes of different lengths can be interchanged in a reverse osmosis purification plant.

It is yet another object of the invention to provide a segment that is lower in cost than preceding units.

Still another object of the present invention is to enable a water purifiction plant to be constructed, the output of which can easily be varied by the addition or deletion of coiled membranes.

An important object of this invention is to enable high hydraulic operating pressures to be utilized without fear of failure by rupture of the tubular element.

It is a sixth object of the invention to provide a segment unit which is consistently interchangeable and can accommodate plastic or thermal changes in overall length.

Figure 2:
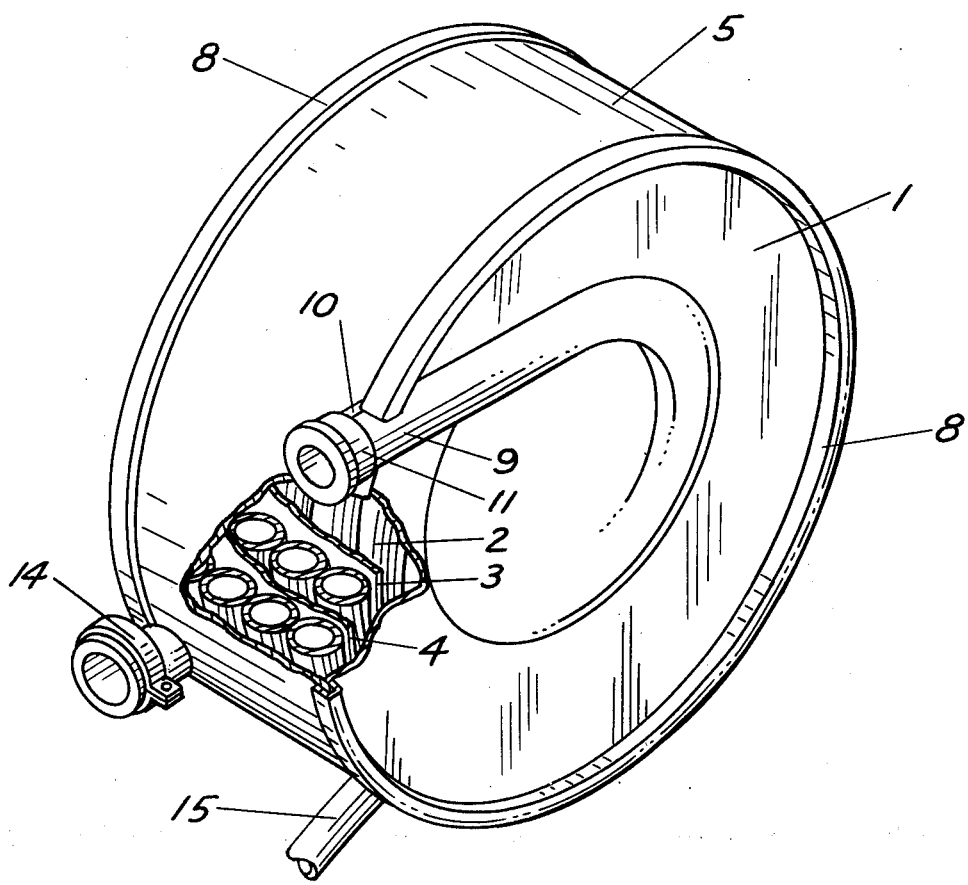
Figure 3:
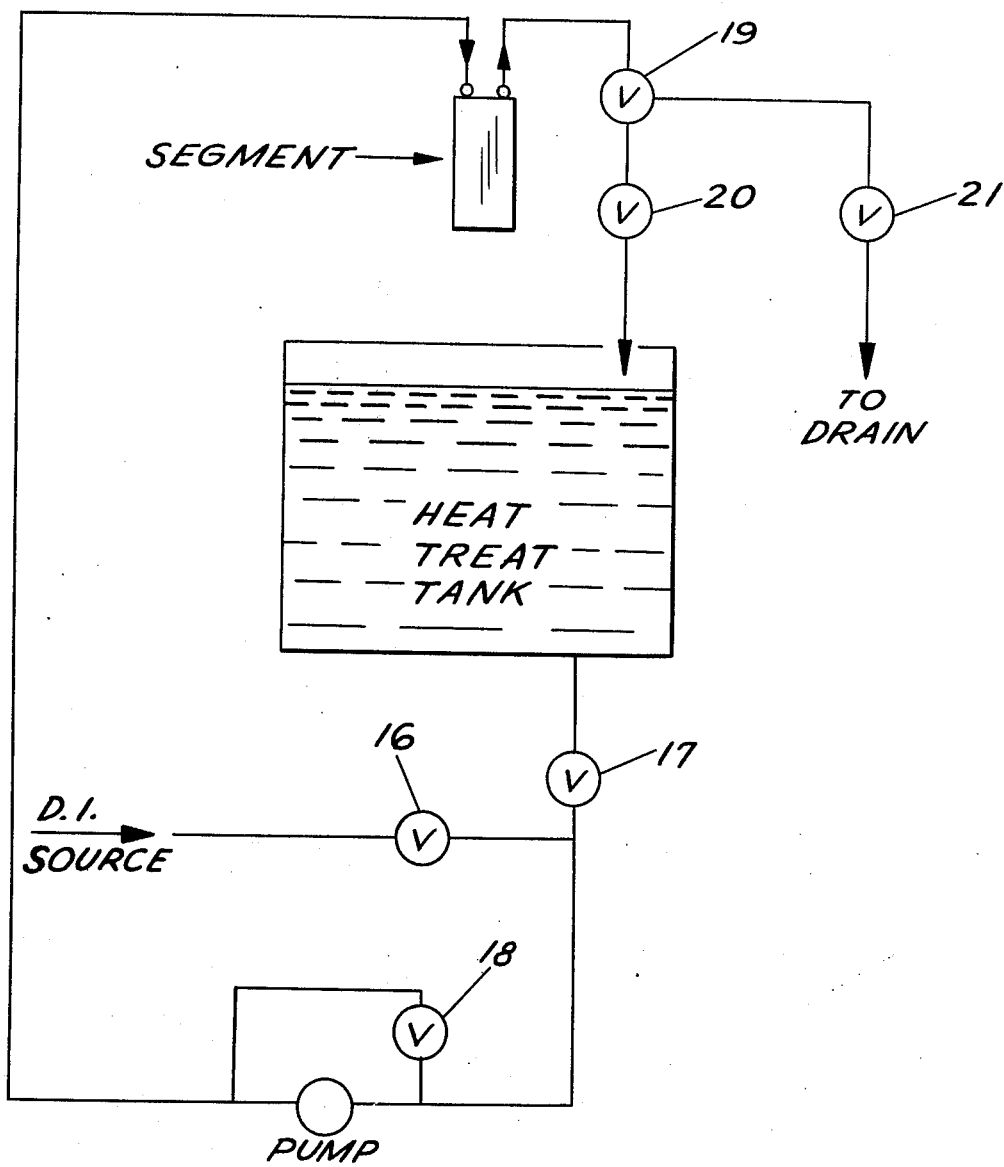

Other objects and advantages will be apparent to those familiar with the art upon reading the specifications and by reference to the drawings, where FIG. 1 is an "exploded" view of a typical segment showing the component parts; while FIG. 2 is an illustration of an assembled segment partly cut away to reveal the method of assembly;

FIG. 3 is a schematic diagram of a heat treating system.

In one embodiment of this invention a cast membrane tube is first closely encased in a braided, knitted, or woven support to withstand the high internal pressure and elevated temperature necessary to wind the membrane onto a spool container. The spool of this embodiment is shown in cylindrical form but spools of square, rectangular, or other shapes can be used if desired.

The forming of the assembled membrane and support structures onto supports of either helical, rectangular or various other shapes is facilitated by the use of high pressure, temperature and tension to promote the flexibility of the membrane and the stretching of the yarn (if plastic yarn is used). The use of the heat, pressure and tension does several things. It adjusts the single or multi-layer braid structure into one at equilibrium, so that slight changes in length or diameter are accomplished prior to the assembly of the membrane and braided support structure onto the spool. The membrane is fitted onto the inside surface of the braided support structure in an intimate fashion during this process. The high pressure minimizes the tendency for buckling of the membrane as it is formed around the shape of the supporting spool. The use of elevated temperatures, for example, as high as 70°C (in the case of asymmetric cellulose acetate membranes) reduces the strength of the membrane to the point where plastic flow bending of the membrane can be accomplished without damage to it. The pressures used in this process can be as high as 100 to 200 psig. This also causes plastic flow of the membrane as it fits into the texture of the inner surface of the restraining braid. A tension of approximately two pounds applied to the tube while spooling has been found effective.

High pressures of as much as 100 to 200 psig are also used in the heat treating step to fully integrate the membrane and the flexible support and to minimize the formation of pinhole effects in the membrane during the subsequent desalination operation. In solid supports, as opposed to the flexibility of braided supports, it has been customary to perform the heat treating step at pressures in the vicinity of 5 to 20 psig. In the use of the flexible braided or knitted support, higher pressures become necessary. The use of high pressure causes the membrane during the heat treating process to fully integrate with the texture of the inside surface of the flexible porous support. Thus, when the completed assembly is put into operation the membrane is well supported in the finest detail and plastic flow under subsequent operating conditions is minimized. This provides for a reduction in the formation of pinhole defects during high pressure operation and minimizes stretch in the membrane "active" (inner skin across which the separation process primarily occurs) layer. The level of pressure required is a function of the structure and materials of construction of the flexible support. More rigid supports, made with finer material on the inner surface, require a lower pressure; materials which are more elastic and which give a coarser inner surface require higher pressures. The use of high hydraulic pressure with or without total immersion is a particularly unique aspect of the heat treating step and is fully necessary to insure the successful completion of this phase under isothermal conditions and the subsequent successful operation of the assembled desalination apparatus. Turning now to the drawings for a more detailed understanding of the invention and in particular to FIG. 1 where 1 is a spool of cylindrical shape having flange-like sides. 2 is a braided membrane tube in the coiled configuration. 3 and 4 are liners extending for approximately 340° and interposed between coil layers to facilitate assembly, their ends being separated as shown to facilitate the flow of product (filtered) fluid to reach the drain connection 7 and 15. The use of the liners 3 and 4 is optional and segments have been satisfactorily constructed without them. Clamping members 9, 10 and 11, also 12, 13 and 14 provide starting and termination points for the coiled membrane. It will be seen in FIG. 1 that 9 and 12 are preformed to accept half the tube diameter and are integral with the spool 1. After the coil 2 is wound onto the spool 1 and is secured by the clamping members 9, 10 and 11, and 12, 13 and 14, a cover 5 is placed as best shown in FIG. 2 after which retaining rings 8 are assembled or the cover secured in other ways. An aperture is provided at the bottom of the cover 5 to receive the drain fitting 7. Cover 5 is secured in place by sealing strip 6 which is adhesively secured to cover 5.

Having described the construction of a typical membrane unit it is now necessary to explain the heat treatment process. Heat treatment is applied to control the permeability of the membrane and the following is descriptive of one predetermined degree of permeability:

Support the unit with a bar through the center of the spool. Unit should be in an upright position (end fitting up). See FIG. 3.

Attach inlet and outlet hoses (hot and cold water supply) to the unit. Slowly introduce room temperature water to the unit by opening (halfway) the flow-restriction valve 19, close valve 20 (return to heat treat tank), open valve 21 (to drain), and slowly open valve 16 (deionized water source) until the module is pressurized to approximately 15 psig. By-pass valve 18 should be open and pump started. Start introducing hot water into the segment by gradually opening valve 17 (hot water supply), maintaining the set pressure, and closing valve 16 (deionized water source) until this valve is completely closed. When the water flowing through the unit is at 66°C (for example, for cellulose acetate) open valve 20 and close valve 21.

Gradually close valve 18 (by-pass) until the desired pressure (for example, 90 psig) is reached. Maintain the desired temperature (for example, 70°–92°C, and pressure for approximately 30 minutes. The actual temperature used within these limits will control the ultimate permeability of the membrane. The higher temperatures produce membranes with greater solute rejection and proportionately, lower product fluid flux, for example. It should be understood that in certain applications a fluid other than water may be used.

Any liquid which is non-injurious to the reverse osmosis qualities of the spooled supported tubular reverse osmosis member may be employed.

Maintain the desired temperature and pressure for approximately 30 minutes, then start opening valve 16 (deionized water source) and closing valve 17 (hot water source), maintaining set pressure, until the temperature of the fluid flow through the modular segment is approximately 38°C. At this time, start opening valve 18 (by-pass) and closing valve 19 (flow restriction), maintaining the set pressure, until valve 19 is almost completely closed; simultaneously close valve 19 and turn system pump off. Maintain deionized water line pressure on segment (valve 16) open until its removal from the heat treat system, for testing.

As mentioned above, the actual temperature and pressure during the heat treating process has an effect on the ultimate permeability of the membrane and this phenomenon is used to advantage by "graduating" the amount of permeability, for instance, by deliberately making the inlet end of the membrane tube more permeable than the outlet end as a result of a carefully controlled temperature drop through the tube. In order to achieve this result it has been found expedient to connect the tube to the hot water supply in such a manner that the flow is opposite to that during actual operating conditions at ambient temperature. This is loosely termed "backward" heat treating.

Remove segment from heat treat facility by closing valve 16 (deionized water source) and opening the seals (endfittings) at the inlet and outlet of the segment. Segment should be in an upright position. Care should be taken to prevent negative pressure from developing as the segment drains.

SPECIFIC EXAMPLE

It is thought desirable at this point to outline in some detail the necessary procedures for the production of a commercially satisfactory reverse osmosis segment. In this description familiarity is assumed with the recent literature on reverse osmosis and more particularly the Loeb et al. U.S. Pat. No. 3,446,359 issued May 27, 1969 and a book entitled *Desalination by Reverse Osmosis*, edited by Merten and published by the M.I.T. Press in 1969. Since the bulk of the published literature is devoted to reverse osmosis through cellulose acetate membranes, this specific example will be limited to such examples.

The fabrication of the membrane is done by casting the membrane from a solution consisting of 25% cellulose acetate dissolved in 45% acetone and 30% formamide. The completely dry cellulose acetate is dissolved in the mixture of acetone and formamide and the resulting solution is filtered to remove impurities which tend to result in defects in the finished membrane.

The specific membrane cast had an outside diameter of nominally one inch and a wall thickness produced by employing a casting bob having an outside diameter of 0.857 inches. The casting procedure is essentially that shown in the Loeb et al. U.S. Pat. No. 3,446,359 in which the membrane is originally formed by drawing a bob past the cellulose acetate formamide acetone casting mixture contained above the bob and enclosed in a one inch inside diameter stainless steel tubing. This stainless steel tubing must be chemically clean internally to enable the finished membrane tube to be readily removed from the stainless steel casting tube. A room temperature of 18°C is ideal for casting although temperatures of 14°C to 22°C can be tolerated. The cast membrane is promptly immersed into chilled deionized water as it is formed. This water temperature should be held between 0.4°C to 1.0°C. The chilled deionized water should flow upward relative to the tubular membrane with a velocity of 0.1 to 1 ft. per second. The geometry of the casting apparatus is such that the membrane is exposed to the air for about 11 seconds before entering the chilled water which serves as a gelation path. The casting is done at the rate of about 5 feet per minute. This procedure should result in tubular membrane having a nominal wall thickness of 0.008 inches with a tolerance of $\neq$ 0.0015 inches. The casting is permitted to remain submerged in the gelation water for a minimum of 1 hour.

After the required degree of gelation has occurred, the stainless steel casting tube containing the lining of cast tubular membrane is transferred without drying to a horizontal tray filled with deionized water at room temperature. After the stainless steel tube and the membrane have attained room temperature, the membrane is gently slid out of the stainless steel tube. It should be noted that any resistance to this removal is indicative of inadequate cleaning of the stainless steel casting tube. It is usually necessary to discard the first 2 or 3 feet of the initial cast end of the membrane because of the uneven wall thickness traceable to the failure of the bob to immediately center itself in the casting tube.

The fragile tubular cellulose acetate membrane must be supported against the heavy internal pressure necessary for reverse osmosis. This has been successfully done by braiding over the cellulose acetate tubular membrane one fibrous layer of 2200 denier dacron and two layers of 4400 denier dacron. This braiding is accomplished upon an oscillating mandrel braiding machine without permitting the cellulose acetate tubular membrane to dry to any appreciable degree. In fact, water is poured over the cellulose acetate membrane as it passes through the braiding machine. The completely braided cellulose acetate tube membrane is now again stored in water in a horizontal tray in preparation for the spooling operation.

The braided supported cellulose acetate tubular membrane must not at any time be exposed to a negative pressure or to a sudden increase in pressure. It is also highly desirable that this membrane be not permitted to dry. This cellulose acetate tubular membrane is now prepared for spooling to produce a compact segment by pressurizing it at about 90 psig by flowing through it hot water. The initial flow of hot water through the segment is about 1.8 gallons per minute which is gradually decreased to 0.6 gallons per minute before the initiation of the spooling. The water exiting from the tubular membrane during spooling is about 58°C with the pressure at the inlet maintained at 90 psig. Approximately 30 minutes is required between the initiation of the flow of hot water and the start of the spooling operation. Pressure and temperature variances between 60 and 120 psig and between 60° and 70°C have been used satisfactorily. The overall diameter of the spool 1 is approximately 20 inches and the axial depth 6 inches. This spool contains approximately 10 turns of 1 inch diameter braided cellulose acetate tubular membrane is helical form. The winding of the straight cellulose acetate braided member is readily accomplished around the short radii required while it is under the pressure and temperatures detailed above.

After the spooling operation is complete, the hot water contained within the tubular membrane is gradually replaced with water at room temperature without changing the applied pressure of 90 psig more than 10 psig. The completed segment is prepared for heat treatment or storage while filled with water.

The final characteristics of the tubular cellulose acetate membrane in so far as reverse osmosis is concerned is established by the heat treating opertion. This heat treating is normally carried out between 70° and 92°C with the higher temperatures tending to decrease the product flux and to increase solute rejection. The heat treatment is accomplished by replacing the cool water in the completed segments with water at the desired heat treating temperature at about 90 psig. The desired temperature and pressure should be maintained for about 30 minutes at which time the hot water within the segment is gradually replaced by cool water and the pressure is gradually lowered to atmospheric pressure. Again, care must be taken to prevent negative pressure from developing during this operation. A tubular membrane so treated should reject 90% of the salt from a feed containing ½% of NaCl and should do so at a flux value of greater than 20 gallons per day per square feet. These values are obtained at an operating pressure of 600 psig.

Throughout this description the term "reverse osmosis" has been used. It is to be understood that the operation known as ultrafiltration is also to be within the scope of this description as the parameters of these two processes merge imperceptibly into one another.

While water is recited as the pressurizing fluid, it is understood that any non-injurious liquid may be employed.

Reverse osmosis modules fabricated from one inch braided cellulose acetate reverse osmosis tubing were fabricated and heat treated at a temperature within the range of 78° to 82°C.

The modules so produced were tested upon Colorado River water containing about 800 parts per million of total dissolved solids. The feed to the module was maintained at a temperature of 25°C and a pressure of 600 psig. This test was continued out for about 3 hours at a Reynolds number of 11,700. The product flux was excellent at 27.1 gallons per square foot per day. The salt rejection was 97.4%. This figure is arrived at by subtracting the salt concentration in the product from the salt concentration in the inlet brine and dividing this result by the concentration in the inlet brine. Similarily the salt reduction was equal to 38.0 which is obtained by dividing the salt concentration in the brine by the salt concentration in the product. The water permeation coeffecient was $3.18 \times 10^{-5}$ cm/sec atm and the salt permeation coeffecient was $1.71 \times 10^{-5}$ cm/sec.

These modules were further tested with a feed containing 5,000 parts per million sodium chloride corresponding to a typical brackish water. The test conditions were the same and resulted in a product flux of 28.2 gallons per square foot per day, a salt rejection of 90.3, a salt reduction of 10.3, a water permeation coefficient of 3.94 × 10⁻⁵ cm/sec atm and a salt permeation coeffecient of 8.37 × 10⁻⁵ cm/sec.

The semi-permeable membrane modules have been described primarily for the production of a desalinated water from a more highly salinated feed. The invention is by no means so limited. It can be used with equal facility to concentrte a solute in a feed by the elimination of a more dilute "filtrate". The use of the process can readily be extended to the purification of sewage and waste waters. A further particularly promising field is the concentration or selective modification of beverages such as beer and fruit juices. Perishable medicinal liquids such as sera and vaccines may be modified or concentrated by this technique.

We claim as our invention:

1. The process of producing a rugged, compact and readily portable reverse osmosis module comprising producing an unsupported reverse osmosis tubular member, applying to the exterior of such tubular reverse osmosis member a fibrous supporting member to enable the tubular reverse osmosis member to withstand internal reverse osmosis pressures, pressurizing said supported tubular reverse osmosis member with a liquid which is non-injurious to the reverse osmosis qualities of the supported tubular reverse osmosis member, said liquid being maintained at a sufficiently elevated temperature and pressure to enable the supported tubular reverse osmosis member to be bent around a comparatively small radius without injury, said temperature being below a value which is capable of heat treating the reverse osmosis membrane to reduce the flow characteristics of the reverse osmosis membrane, winding the heated and pressurized supported tubular reverse osmosis member onto a spool having a radius sufficiently small to render impossible such a winding operation in the absence of the heated pressurizing liquid, removing the heated pressuring liquid without creating within the supported tubular reverse osmosis member any negative pressure, and replacing the pressurized heated liquid with a liquid which is non-injurious to the reverse osmosis qualities of the spooled supported tubular reverse osmosis member, said liquid being under substantial pressure of at least about 90 psig to improve the contact between the exterior of the tubular reverse osmosis member and the supporting fibrous member and being heated to a temperature sufficient to establish the desired reverse osmosis qualities in the spooled supported tubular reverse osmosis member.

2. The process recited in claim 1 in which the pressure and temperature ranges employed in the spooling operation are respectively 60 to 120 psig and 60° to 70°C.

3. The process recited in claim 1 in which the heat treating operation is conducted at a temperature higher than spooling temperature within the range of 70° to 92°C.

4. The process recited in claim 1 in which the temperature and duration of the heat treatment operation is such that the heat treated membrane will produce a product flux of at least 20 gallons per day square foot at an operating pressure of 600 psig while rejecting 90% of the salt from a one half percent salt solution feed.

* * * * *